No. 614,133. Patented Nov. 15, 1898.
J. P. W. ROACH.
SWITCH SHIFTING MECHANISM FOR ELECTRIC CARS.
(Application filed Feb. 1, 1898.)
(No Model.)
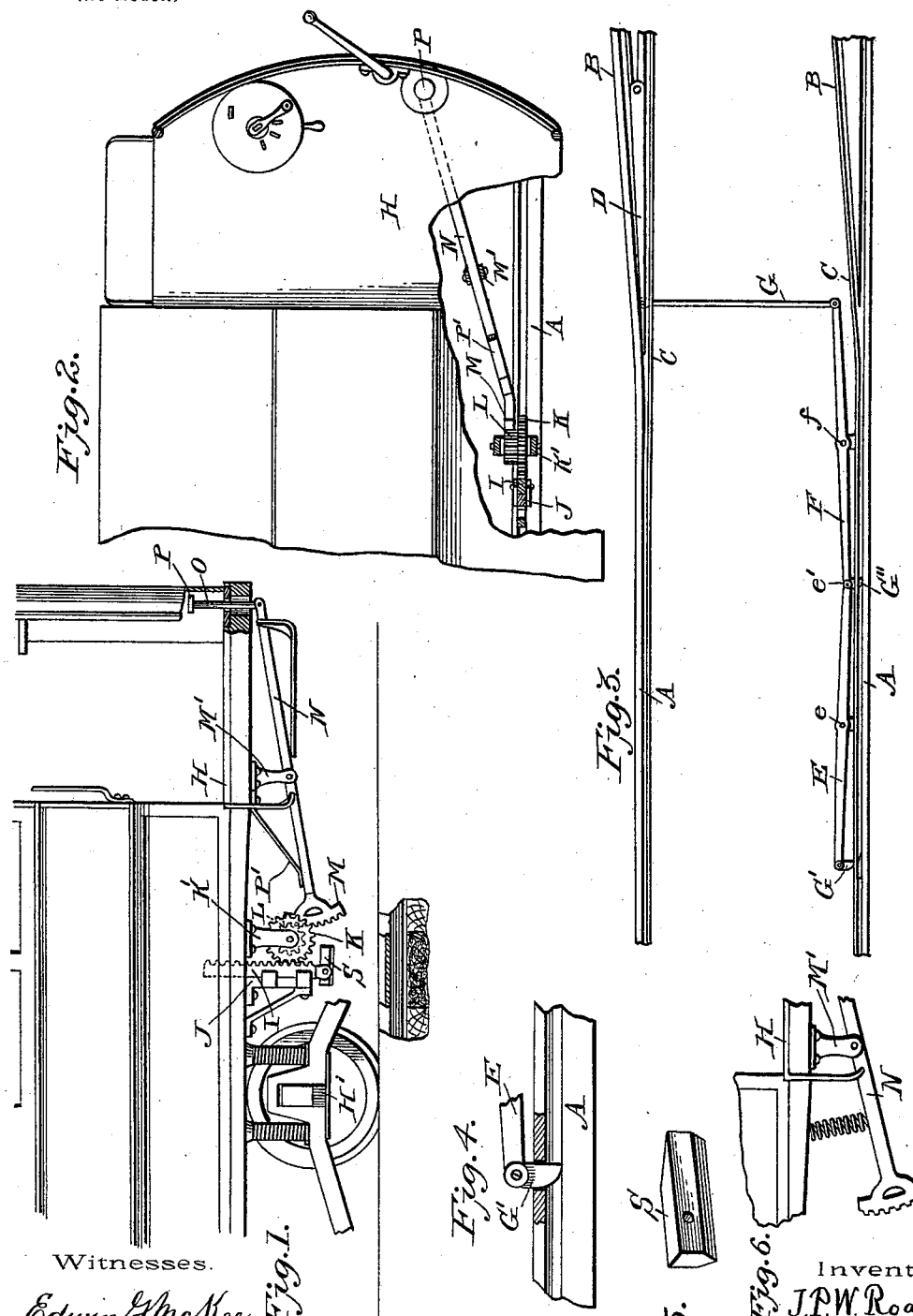
Witnesses.
Edwin G. McKee
Philip Mauss.
Inventor.
J. P. W. Roach
by E. W. Anderson
his Attorney.

UNITED STATES PATENT OFFICE.

JEREMIAH P. W. ROACH, OF CONCORD, NEW HAMPSHIRE.

SWITCH-SHIFTING MECHANISM FOR ELECTRIC CARS.

SPECIFICATION forming part of Letters Patent No. 614,133, dated November 15, 1898.

Application filed February 1, 1898. Serial No. 668,750. (No model.)

*To all whom it may concern:*

Be it known that I, JEREMIAH P. W. ROACH, a citizen of the United States, and a resident of Concord, in the county of Merrimac and State of New Hampshire, have invented certain new and useful Improvements in Switch-Shifting Mechanism for Electric Cars; and I do declare the following to be a full, clear, and exact description of the invention, such as will enable others skilled in the art to which it appertains to make and use the same, reference being had to the accompanying drawings, and to letters of reference marked thereon, which form a part of this specification.

Figure 1 of the drawings is a side view of a portion of a street-car, showing a part of this invention applied thereto. Fig. 2 is a plan view of the same part broken away. Fig. 3 is a plan view showing that part of the invention which is applied to the track. Figs. 4, 5, and 6 are detail views.

This invention is designed to provide means of novel and efficient character for connection with cars, and particularly electric cars, for the purpose of shifting switches without the necessity for the stopping of the car or the use of a shifting-stick.

With this object in view the invention consists in the novel construction and combination of parts, all as hereinafter described, and pointed out in the appended claims.

Referring to the accompanying drawings, the letters A A designate the main or straight track rails; B B, the rails of a branch track or turnout; C C, guard-rails, and D the movable switch-point.

E is a lever which is fulcrumed intermediately of its ends at $e$ to an inwardly-projecting lug or bracket carried by one of the guard-rails. This lever lies just inside of said guard-rail, approaching the branch track or turnout. The forward end of said lever is pivotally connected at $e'$ to the rear end of a second and similar lever F, which is fulcrumed at $f$ and to whose forward arm is connected the switch-rod G, which is also connected to and operates the point-rail D. Attached to the rear end portion of the lever E and projecting through an opening in the adjacent guard-rail is a trip-lug G', and connected to the pivot $e'$ is a second and similar trip-lug G''.

H designates a portion of the frame of a car, and H' is the front truck thereof.

I designates a vertically-movable rack-bar, which is supported in a guide-bracket J, which depends from the under side of the car-frame a short distance in front of one of the wheels of the truck H'. K is a gear-wheel, whose teeth mesh with the teeth of the said rack-bar and which is journaled in a depending bracket K'. On the shaft or axle of said gear-wheel and rigidly connected thereto is a pinion L, the teeth of which are engaged by the teeth of a toothed segment-arm M. This toothed segment-arm is carried by the rear arm of a lever N, which is intermediately fulcrumed in a depending bracket M' on the under side of the car. The forward arm of said lever extends obliquely underneath the front platform and is connected by a vertical rod O with a pedal P above the platform and within convenient reach of the motorman's foot.

P' is a flat or spiral spring which is secured to the car-frame and bears downwardly at its free end portion upon the rearward arm of said lever N.

Secured to the lower end of the vertically-movable rack-bar I is a wedge block or shoe S, which when depressed to proper position by the downward movement of the said bar is designed to engage with the trip-lug G' or G'', as the case may be.

To shift the switch, the motorman depresses the pedal P with his foot at the proper time, and thereby actuates the lever N to operate the gear-wheel K, and thereby depress the rack-bar I and its shoe for engagement with one of said trip-lugs. It will be readily seen that the engagement of the shoe with the trip-lug G' will actuate the levers E and F to move the point-rail in one direction, while its engagement with the trip-lug G'' will move said rail in the opposite direction. When the pedal P is released by the foot, the spring P' operates to return the lever N, the gear-wheel K, and the rack-bar and shoe to their original positions.

Having thus described my invention, what I claim as new, and desire to secure by Letters Patent, is—

1. The combination with a switch having a movable point-rail, and trip and lever devices arranged along the track approaching the switch and operatively connected with the said point-rail, of a car having a vertically-movable shoe arranged, when in proper position, to impinge against the trip devices and thereby operate the levers to throw the said point-rail, a vertically-movable rack-bar which carries the said shoe, a gear-wheel which engages the teeth of said rack-bar, a pinion connected with said gear-wheel, a toothed segment which engages the said pinion, and a pedal-operated lever which carries the said segment, substantially as specified.

2. The combination with a switch having a movable point-rail, of the two intermediately-pivoted, laterally-movable levers E and F, whose adjacent ends are connected by a pivot, a trip-lug carried by the rear arm of the rearmost lever, a second lug carried by the pivot which connects the two levers, and a connection between the front arm of the foremost lever, and the movable point-rail, substantially as specified.

In testimony whereof I affix my signature in presence of two witnesses.

JEREMIAH P. W. ROACH.

Witnesses:
DAN C. RICHARDSON,
FRANK E. SHEPARD.